J. F. W. SCHULZE.
PROCESS OF FRACTIONAL CONDENSATION.
APPLICATION FILED JUNE 21, 1919.
1,418,885.
Patented June 6, 1922.
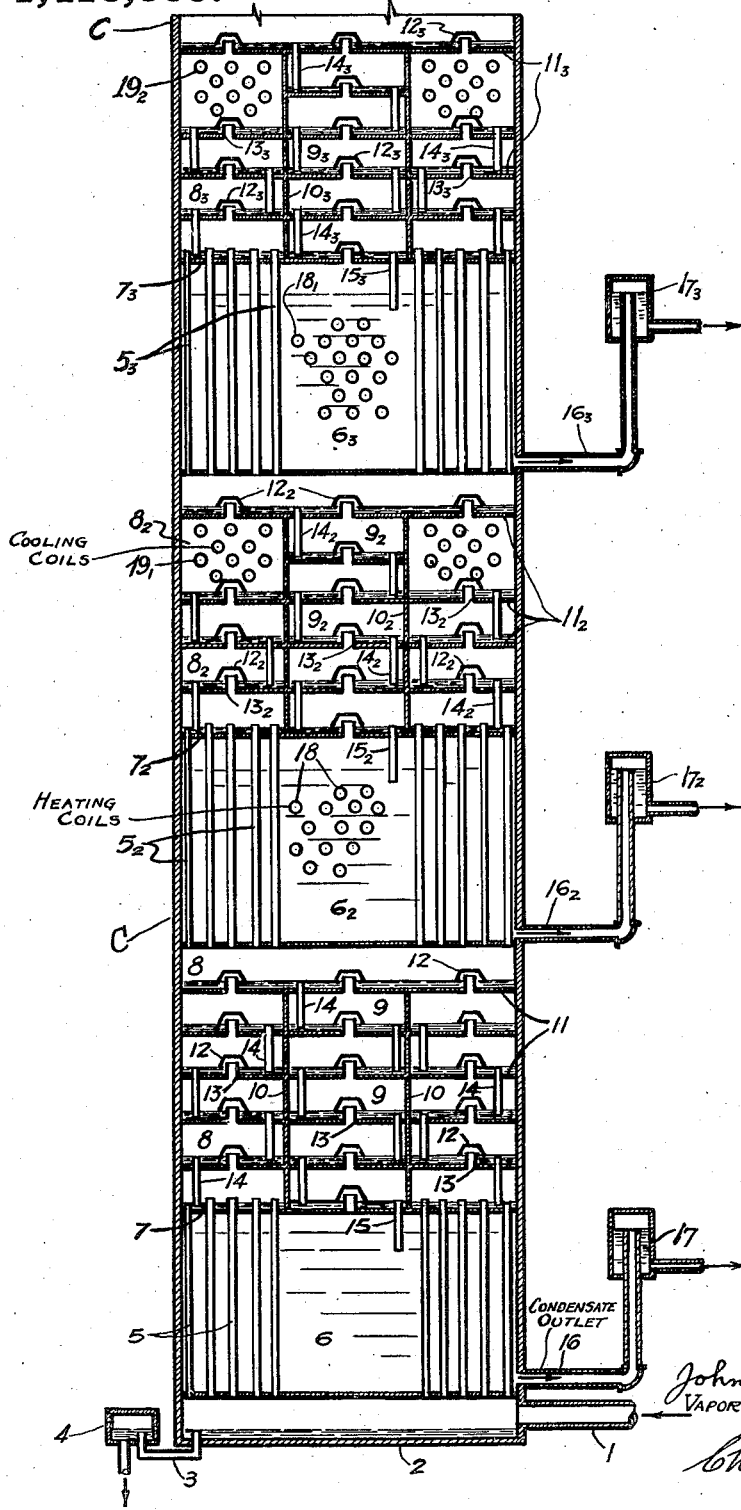
INVENTOR
John F. W. Schulze
BY
Chas. W. Mortimer
ATTORNEY

UNITED STATES PATENT OFFICE.

JOHN F. W. SCHULZE, OF NEW YORK, N. Y., ASSIGNOR TO THE BARRETT COMPANY, A CORPORATION OF NEW JERSEY.

PROCESS OF FRACTIONAL CONDENSATION.

1,418,885.  Specification of Letters Patent.  Patented June 6, 1922.

Application filed June 21, 1919. Serial No. 305,857.

*To all whom it may concern:*

Be it known that I, JOHN F. W. SCHULZE, a citizen of the United States, residing at New York, in the county of Bronx and State of New York, have invented certain new and useful Improvements in Processes of Fractional Condensation, of which the following is a specification.

This invention relates to processes and apparatus whereby a more effective fractional condensation may be carried out. It comprises briefly, as a process, a process of fractional condensation in which fractions of mixed vapors are condensed from the mixed vapors by suitable cooling mediums maintained at suitable temperatures, and in which the condensate flows in counter current direction to the mixed vapors and in contact with it over suitable baffles or plates thus concentrating the condensate by bringing it into heat interchanging relation with the vapor, whereby the less volatile components are condensed from the vapor and the more volatile components in the condensate are revaporized, and in which the condensate is further concentrated by heat interchange with the mixed vapors, but out of direct contact with them. As an apparatus the invention comprises a number of condensation column sections, each section comprising a chamber in which a fraction of condensate collects which fraction is heated by tubes through which the mixed vapors that are hotter than said condensate are caused to pass; a compartment provided with plates in which a less volatile fraction of the condensate and the mixed vapors pass in counter current flow, thus bringing the heavier condensate and mixed vapors into heat interchange relation; a cooling means to produce partial condensation of the mixed vapors; and a compartment provided with plates in which the condensate which collects in the chamber is concentrated out of contact with the mixed vapors. The cooling means may be omitted from one or more of the sections, and one or more of the chambers in which the fractions of condensate collect may be provided with heating means, if desired. The invention further comprises certain novel steps and combination of steps of the process, and certain novel combinations and arrangements of the apparatus; all as more fully hereinafter set forth and as claimed.

In the fractional condensation of complex mixed vapors it is important that the fractions separated should themselves be distillable within a close temperature range. This necessitates the separation of each fraction as free as possible of the components of the mixed vapors that are more volatile or less volatile than the fraction desired. A fraction free from the more volatile components cannot be obtained efficiently by condensing the fraction in contact with vapors containing the more volatile constituents, as is done in usual type of condensation apparatus, since at the point where condensation takes place the condensate and the vapor must be in equilibrium and therefore the liquid must contain some of the more volatile components.

It is therefore necessary, in order to obtain a fraction that will distil within a close temperature range, to concentrate the condensate out of contact with mixed vapors that contain any considerable proportion of the more volatile components.

By this present invention it is possible to obtain in a single apparatus and with a continuous process an efficient and inexpensive separation of mixed vapors into fractions that will distil completely within a close temperature range. By this invention it is also possible to utilize a part of the heat contained in the mixed vapors for concentrating the condensate fractions and separating therefrom the more volatile components, which are to be collected in lower boiling fractions, so that the separation and concentration of the fractions is largely effected by the heat present in the vapors entering the apparatus. Other advantages of the invention will appear from the following more detailed description.

I will now proceed to describe my invention more in detail with particular reference to the accompanying drawing illustrative of certain embodiments of the apparatus of the invention, in which the novel process of this invention can be practiced, it being intended and understood that the invention will be illustrated by, but is not limited to, the specific embodiments of the diagrammatic sketch so illustrated and described. This scheme of fractional condensation is applicable to complicated vapor mixtures such as coal tar creosote oils or other like complex mixtures.

The accompanying drawing shows more or less diagrammatically a partial elevation and partial vertical section of the apparatus embodying my invention. The apparatus as shown is constructed of a plurality of sections arranged one above the other to form a single column. Such construction reduces to a minimum radiation losses and cost of construction. It is to be understood, however, that the process of this invention may also be practiced in an apparatus not so integrally arranged, such as parallel columns for example.

In the drawing, reference character 1 refers to an inlet pipe leading to a header 2 from which leads an outlet pipe 3 to a liquid level maintaining device 4.

A series of tubes 5 open at both ends, lead from the header 2 through the cylindrical chamber 6 and terminate a short distance above the plate 7. The column C is divided above the plate 7 into an annular dephlegmating compartment 8 and a cylindrical dephlegmating compartment 9 by means of a partition wall 10. The compartments 8 and 9 are provided with the usual dephlegmating plates 11 having the caps 12, the vapor tubes 13 and the overflow tubes 14. The topmost one of the plates 11 has no overflow tube except within compartment 9. The outer vapor tubes 5, being made somewhat shorter than the others, serve as overflow tubes for the bottom plate 11 in compartment 8 and an overflow tube 15 leads from this plate in compartment 9 to the chamber 6. An outlet pipe 16 leads from the bottom of chamber 6 to a liquid level maintaining device 17.

The other sections of the column C are similar to the one just described and are designated by corresponding reference characters which are distinguished by subscripts. The chambers $6_2$ and $6_3$ are shown as provided with heating coils 18 and $18_1$. The compartments $8_2$ and $8_3$ are provided with condensing or cooling coils $19_1$ and $19_2$.

The last of the sections of the column C may be provided with means (not shown) for leading vapors to a partial condenser and returning the condensate to the upper plate $11_3$. The number of sections of the column C may be varied and, instead of being assembled one above the other, as shown, they may be separated from each other and appropriate connections used for conveying the vapors and condensates from one section to another.

The operation is as follows:—

The vapors enter the apparatus through the pipe 1 into the chamber 2 from which they pass through tubes 5 into the first dephlegmating compartment 8 of the column C. The vapors then leave compartment 8 through the vapor pipes in top plate 11 and pass through pipes $5_2$, similar to pipes 5, into the next dephlegmating compartment $8_2$ of the column C. The vapors then come into contact with the cooling coils $19_1$, which may either be regulated to a definite temperature or may be regulated to produce a certain amount of condensation. These coils may act directly as heat exchangers, by using the liquid to be distilled as cooling medium for them. The vapors passing through compartment $8_2$ strike the cooling coils $19_1$, whereby a part of the vapors are condensed. The uncondensed vapors pass on through the vapor pipe in top plate $11_2$, which has no overflow pipe communicating with compartment $8_2$, and then pass on through tubes $5_3$, similar to tubes 5 and $5_2$, into the next dephlegmating compartment $8_3$ where more of the vapors are condensed by cooling coil $19_2$, the uncondensed vapors passing on through as many more sections similar to the ones described as may be required to secure the desired number of fractions. From the topmost section, the uncondensed part of the vapor will flow through a partial condenser (not shown), the condensate from which flows back upon a plate similar to top plate $11_3$, the uncondensed vapor passing on to a total condenser, the condensate from which is run to storage.

A part of the vapor is condensed by cooling coil $19_2$, and the condensate returns through the compartment $8_3$ of the column C, where a certain amount of interchange takes place on the plates $11_3$ with the upcoming vapor, thus partially concentrating the condensate by depriving it of part of the more volatile component. The condensate flows back through certain of the tubes $5_3$ onto top plate $11_2$. The overflow pipe $14_2$ from top plate $11_2$ conducts the condensate into the dephlegmating compartment $9_2$ of the column. The condensate flows back over the plates in compartment $9_2$ upon which some of the more volatile components of the condensate are volatilized by the heat conducted by the plates $11_2$ from the hotter vapors passing through the compartment $8_2$ of the column. From the bottom plate $11_2$ of compartment $9_2$, the condensate flows through overflow pipe $15_2$ into chamber $6_2$ where it is exposed to the heat of the vapors passing through tubes $5_2$, whereby the more volatile component remaining in the condensate will be vaporized. The condensate discharges through the constant level overflow $17_2$ into suitable heat exchangers, coolers and receivers. The vapor given off in chamber $6_2$ will pass upwardly through the compartment $9_2$ where heat interchange takes place with the downflowing condensate, the vapor then leaving the compartment $9_2$, mixing with the vapors which pass cooling coil $19_1$, and passing on through tubes $5'_3$ to the next compartment above. In chamber $6_2$ and in the similar chambers, pipes 18, $18_1$ may be provided through which a suitable heating medium may be circulated to promote evaporation of the more volatile components from the fraction and thus still further concentrate it.

In a similar way, the liquid formed at cooling-coil $19_1$ by partial condensation of the vapors, will flow down through compartment $8_2$ and through tubes $5_2$ upon top plate 11 from which it flows through overflow 14, through compartment 9 into chamber 6 from which it is discharged through the constant level overflow 17 to suitable heat exchangers, coolers and receivers. In a similar way, the condensate formed in other sections of the apparatus (not shown) would be concentrated. Any condensate that would be formed in the compartment 8, or in the tubes 5, would collect in header 2, from which it can be withdrawn through overflow 4 and used as desired or mixed with the liquid to be distilled.

From the foregoing description it will be evident that the process and apparatus of the present invention enable a simple and inexpensive separation of a complex vapor resulting from distillation into a desired number of fractions, each fraction itself distilling within a close temperature range. For example, the fraction collected through overflow $17_2$, will contain components of the vapors that passed the cooling coil $19_1$ which is maintained at any desired temperature, but were condensed by cooling coil $19_2$ maintained at any desired temperature lower than the temperature in coil $19_1$. The condensate from coil $19_2$ is concentrated by heat exchange and dephlegmation with the mixed vapors in compartment $8_3$, and is then still further concentrated by heat exchange and dephlegmation in compartment $9_2$, out of contact with the mixed vapors, and is finally reheated in chamber $6_2$ to a temperature higher than the temperature of coil $19_1$ which it passed in a vapor state. In this manner the more volatile components of the fraction will be removed, and a fraction that will distil within a close temperature range will be obtained.

What I claim is:

1. The herein described process, which comprises condensing a fraction of a mixed vapor, and concentrating the fraction by heat interchange and dephlegmation with the vapors generated from the fraction by reheating the fraction to a higher temperature than that at which the fraction was in equilibrium with the mixed vapor, by heat transfer from the mixed vapor but out of contact with the mixed vapor.

2. The herein described process, which comprises condensing a fraction of a mixed vapor, and concentrating the fraction by heat interchange and dephlegmation with the vapors generated from the fraction by reheating the fraction to a higher temperature than that at which the fraction was in equilibrium with the mixed vapor, by heat transfer from the mixed vapor but out of contact with the mixed vapor and by heat transfer from another source of heat.

3. The herein described process, which comprises condensing a fraction of a mixed vapor, removing the fraction out of contact with the mixed vapor, and concentrating the fraction by heat interchange and dephlegmation with the vapors generated from the fraction by reheating the fraction to a higher temperature than that at which the fraction was in equilibrium with the mixed vapor, by heat transfer from the mixed vapors but out of contact with the mixed vapors.

4. The herein described process, which comprises condensing a fraction of a mixed vapor, concentrating the fraction by heat interchange and dephlegmation with the mixed vapor, removing the fraction out of contact with the mixed vapor, and further concentrating the fraction by heat interchange and dephlegmation with the vapors generated from the fraction by reheating the fraction to a higher temperature than that at which the fraction was in equilibrium with the mixed vapor, by heat transfer from mixed vapors but out of contact with the mixed vapors and by heat transfer from another source of heat.

5. The herein described process which comprises obtaining condensate from a mixed vapor, dephlegmating said condensate through a mixed vapor of substantially the temperature of those from which said condensate was obtained, removing said condensate out of contact with said vapors and dephlegmating it through vapor at a higher temperature than said first named vapors, and then passing mixed vapors of still higher temperature through said condensate but out of contact therewith.

In testimony whereof I affix my signature.

JOHN F. W. SCHULZE.